H. NAPIER.
Turpentine Still.
No. 31,991. Patented April 9, 1861.
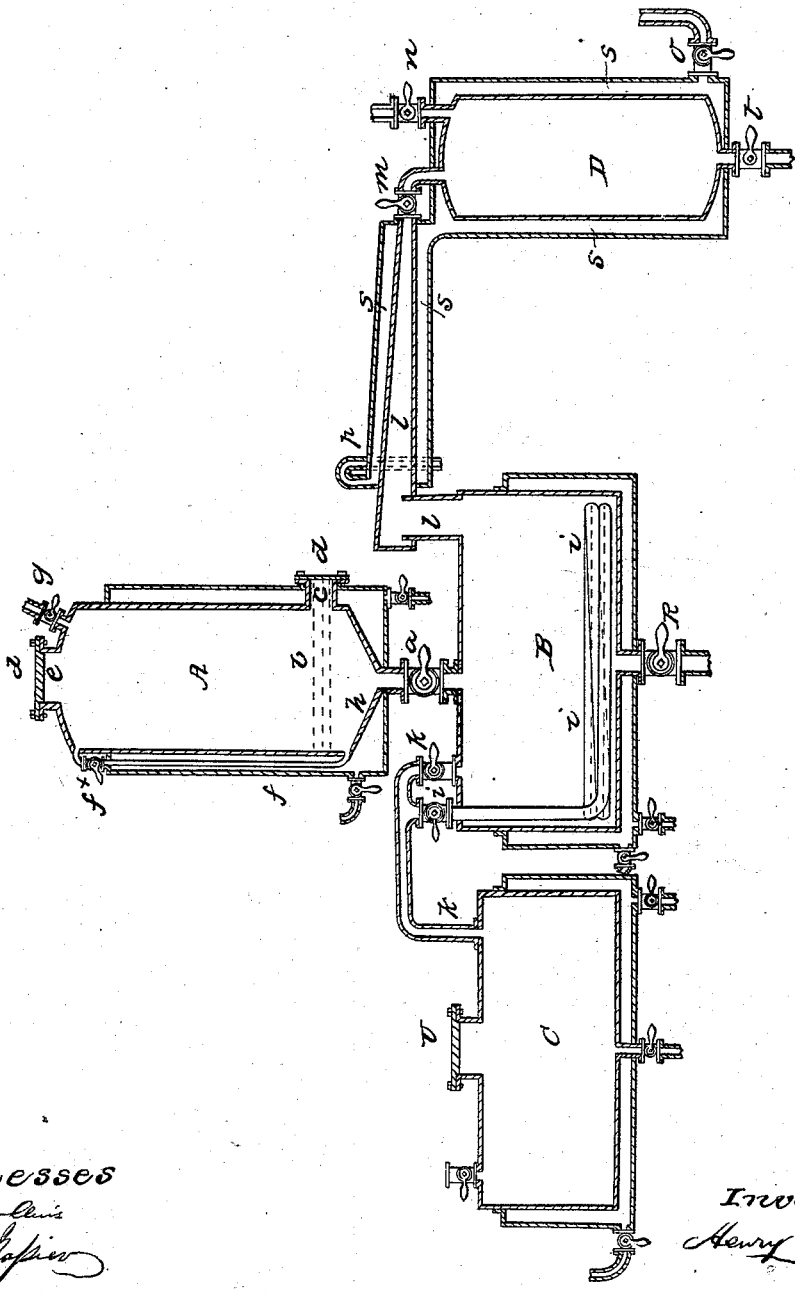

UNITED STATES PATENT OFFICE.

HENRY NAPIER, OF BROOKLYN, NEW YORK.

IMPROVEMENT IN APPARATUS FOR MANUFACTURING TURPENTINE AND ROSIN.

Specification forming part of Letters Patent No. 31,991, dated April 9, 1861.

*To all whom it may concern:*

Be it known that I, HENRY NAPIER, of Brooklyn, in the county of Kings and State of New York, have invented a new and useful Improvement in Apparatus for the Manufacture of Oil of Turpentine and Rosin; and I do hereby declare that the following is a full and exact description thereof, reference being had to the accompanying drawings, and to the letters of reference marked thereon.

The vessel A represents the strainer, and is connected with the still B by the pipe and tap (or valve) $a_t$. The strainer is furnished at $b$ with a sieve or sieves of varying fineness, made, preferably, of tinned copper wire. These sieves are ranged one above the other, at distances of about one inch apart, the finest and bottom sieve being eight or nine inches from the bottom of the vessel A. They may be removed and replaced at the opening C, which, as well as the man-hole $e$, is closed, when the strainer is in use, by an air-tight cover, $d\ d$.

$g$ is a pipe and tap, for connection with an air-pump.

$f$ is a pipe extending from the upper portion of the vessel A to within a short distance of the bottom at $h$ and below the sieves. The pipe $f$ is furnished with a tap at $f^\times$, and may, if desired, be extended to the still itself or to an intermediate vessel, the principle in either case being unchanged. The necessary quantity of crude turpentine being put into the vessel A, the covers of the man-hole and opening for the sieves are put on and made secure, the taps $g$, $a$, and $f^\times$ are opened, and all other taps or valves connecting the still with other portions of the apparatus closed. The air-pump is then set in motion and a vacuum formed both in the strainer and the still. The vessel A is then gently heated either by a water-jacket or any convenient plan, and its contents melted. This being effected, the tap $f^\times$ must be closed and the vacuum in the upper portion of the vessel A (above the mass of melted turpentine) destroyed. The vacuum being still maintained in the still and lower portion of the vessel A, the atmospheric pressure forces the melted turpentine through the sieves, leaving the leaves, twigs, and foreign matters on them. The heat necessary for this part of the process depends on the height of the vacuum formed. The still B may now be considered charged, and the tap connecting it with the strainer A must be closed. The vessel C is intended for the generation of steam, and is connected with the still by the pipes and taps $i$ and $k$. The pipe $i$ reaches to the bottom of the still, where it is formed into a coil (or its equivalent) and pierced with numerous small holes for the distribution of the steam through the mass.

D is the condensing-vessel, connecting with the still by the still-head $l$. This latter can be closed by a tap at $m$.

$n$ is the connection for the air-pump. The condenser and still-head are surrounded by a water-jacket, $s$, supplied with cold water at $o$, having its exit at $p$. The condenser should be of sufficient capacity to contain all the condensed steam as well as the oil of turpentine sent over from one charge. A worm may be substituted for this condensing-vessel; but in such case the air-pump is required to be kept in operation during the whole process, and I prefer my plan. The still and the steam-vessel C are both heated by water-jackets or on any convenient plan giving facilities for the regulation of the heat. The still being charged and the steam-vessel C supplied with water, the taps $k$, $m$, and $n$ are opened and the tap $i$ closed. The air-pump is then put in operation, and a vacuum—whole or partial—formed in the vessels B, C, and D. The heat is then applied to the still and steam-vessel, the tap $k$ is to be closed, and that at $i$ opened. The steam generated in C passes through the mass in the still, and carries along with it the oil of turpentine to be condensed in D. When the whole of the oil has passed over, the connection between the steam-vessel and the still must be closed and the process continued for a short time longer, in order to drive off any remaining moisture from the rosin remaining in the still. This rosin may then be discharged from the exit-pipe R, and will be found to be almost colorless and applicable to the finest purposes. The whole of the above process being conducted *in vacuo*, the heat necessary is very low. In the concluding portion of the operation a heat of 160° Fahrenheit is sufficient for the purpose, and a still lower degree drives off the volatile oil.

If the condensing-vessel D is made of a capacity insufficient for the purpose of containing the whole of the condensed matter from one charge, the tap $m$ may be closed, the oil and steam already condensed discharged, and a fresh vacuum formed in D without destroying that already existing in B and C.

I prefer cylindrical vessels for my purpose, as they are the least expensive in construction, and for their material I prefer copper tinned inside.

I do not desire to bind myself to a given form of vessel, nor to the material of which it is made, nor yet to the precise degree of heat to be employed in the process, this last being dependent on the state of the vacuum formed. Neither do I claim the use of a vacuum-pan for the making of turpentine and rosin, the inspissation of vegetable saps and juices *in vacuo* having been known and employed for a great number of years. Nor do I claim the passing of steam through the turpentine for the distillatory process.

What I claim as my invention, and desire to secure by Letters Patent, is—

The arrangement together for joint operation, in the manner substantially as herein shown and described, of the jacketed vacuum straining-vessel A, retort B, boiler C, and condenser D, for the purposes set forth.

HENRY NAPIER.

Witnesses:
   G. J. HUGHES,
   JOHN BLOODWORTH,
*Patent Agents, 17 Cross Street, Manchester.*